United States Patent Office 2,954,537
Patented Sept. 27, 1960

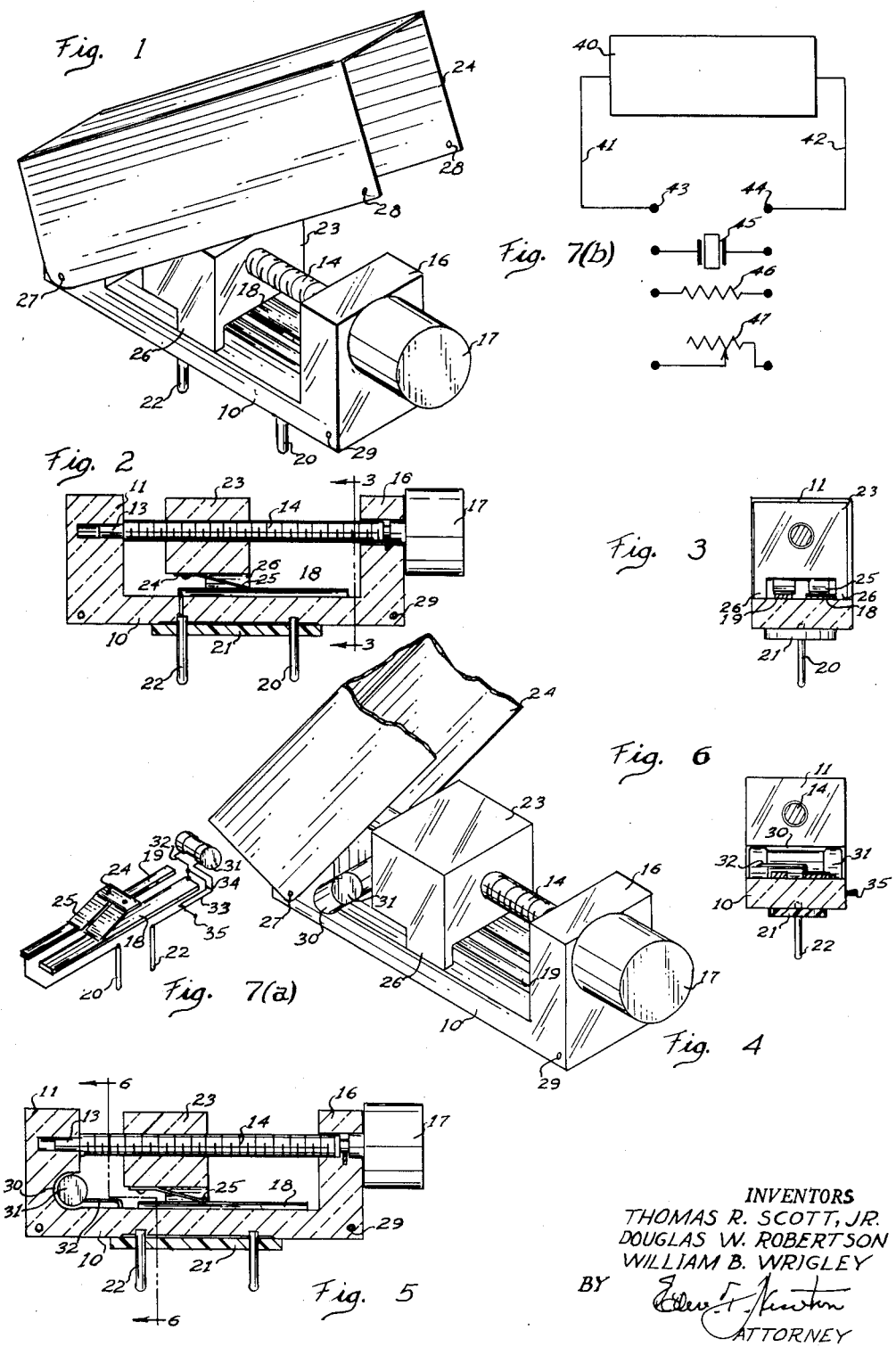

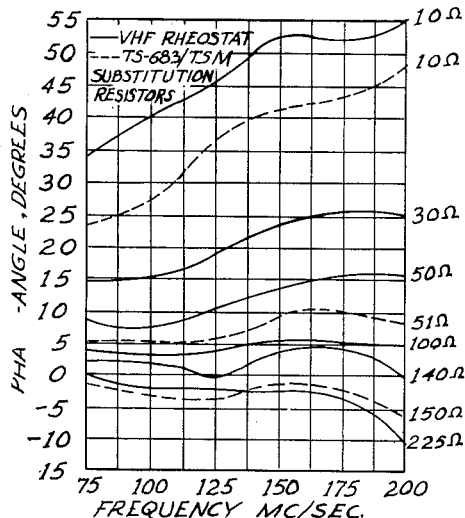
Fig. 8
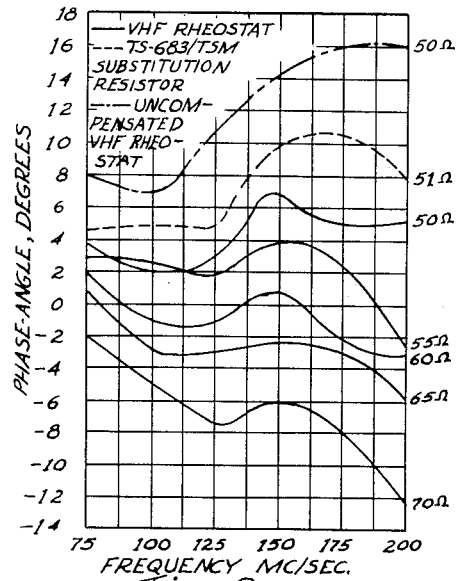
Fig. 9
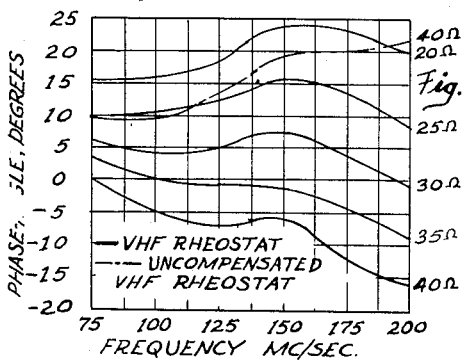
Fig. 10
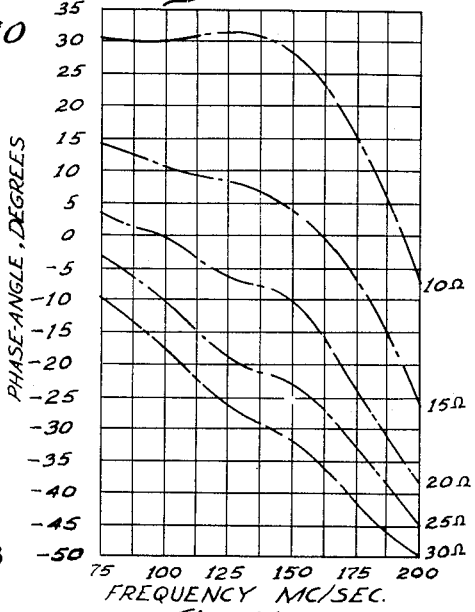
Fig. 11
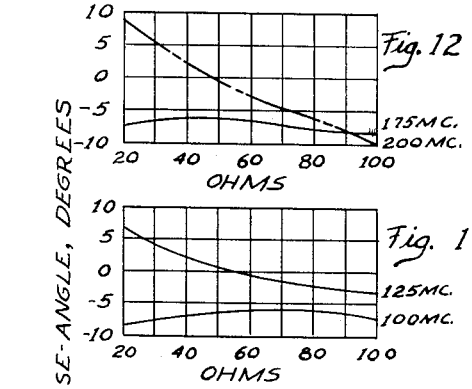
Fig. 12
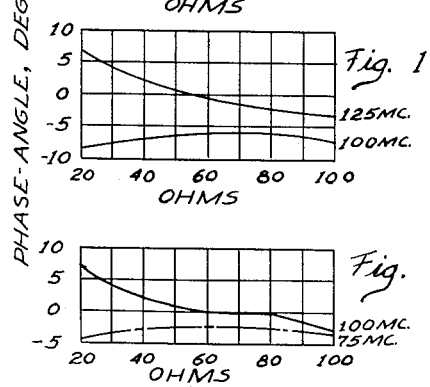
Fig. 13
Fig. 14
INVENTORS
THOMAS R. SCOTT, JR.
DOUGLAS W. ROBERTSON
WILLIAM B. WRIGLEY
BY
ATTORNEY

2,954,537

VHF RHEOSTAT AND METHOD OF USING SAME

Thomas R. Scott, Jr., Atlanta, Douglas W. Robertson, Decatur, and William B. Wrigley, Marietta, Ga., assignors to Georgia Tech Research Institute, Atlanta, Ga.

Filed May 24, 1956, Ser. No. 586,945

2 Claims. (Cl. 333—81)

This invention relates to a very high frequency rheostat and a method of using same, and is particularly concerned with low phase-angle variable resistors and their use in measuring the equivalent electrical parameters of quartz crystals and the like.

Many applications in the electronics field require the use of low phase-angle variable resistors. This is especially true in the very high frequency range. For instance, the technical requirements of a crystal impedance meter, as an instrument for measuring the equivalent electrical parameters of a quartz crystal, by the substitution-resistance method, are such that the present substitution resistors are not suitable due to large phase-angle characteristics. The phase-angle characteristics of resistors are primarily determined by stray inductive and capacitive reactances associated with the resistive element. In variable resistor devices, additional problems of varying reactances are encountered. Constant electrical path length is necessary if correction of the phase-angle is to be accomplished. Other factors may also assist in reducing varying reactances, as by minimizing the capacitive effects by maintaining suitable orientation between the resistance element and the collector bar of a rheostat, and a further reduction in reactance effects may be achieved by minimizing insofar as possible the length of the connecting leads to the device. In use, the structure of the present invention has been found effective as a substitution element in crystal impedance meters and the present inventive concept embraces such use of the present VHF rheostat. The present rheostats may act as substitutes for a set of standard fixed substitution resistors, and in such use the devices may include series capacitive compensation elements associated with the rheostat. With such elements of varying value, a series of rheostats will take the place of the previously used graduated series of fixed resistors. The important advantage of the use of these variable resistors is that in determining the equivalent electrical parameter of a crystal a substantially exact value may be determined and interpolation between the values of fixed resistors is not necessary.

The primary object of this invention is to provide a low resistance rheostat that exhibits low phase-angle characteristics in the very high frequency range.

Another object is to use a configuration such that lead length is reduced, thereby insuring minimum inductive reactance.

Another object is to arrange the elements of the rheostat in such manner as to provide a constant electrical path length which insures constant inductance regardless of resistance setting.

Another object is to reduce the stray capacity between the resistance and parallel conductor elements by using a thin metal film, deposited on glass, as the resistance element. Thus, capacitive effects are minimized due to the relatively small area which the edge of the resistance film presents to the conductor element.

Another object is to maintain constant capacity with resistance setting. Constant capacity between the conductor element and the resistance element is assured by maintaining constant spacing between the elements. The capacity of the shorting bar to the resistance and conductor elements remains constant during lateral movement of the carriage, since the distance between the elements and the shorting bar is not changed.

Another object is to provide a resistance in which, because of the physical configuration of this invention, resistance values of approximately 100 to 250 ohms exhibit acceptable phase-angle characteristics without the necessity of reactance compensation. In the present state of the art, VHF range components exhibiting phase-angle characteristics of approximately plus or minus ten degrees do not appear to introduce appreciable error in certain important applications.

An objective is further to provide for a direct and accurate method of determination of equivalent electrical parameters of quartz crystals.

The invention also has as an objective the provision of means for and a method of substituting a series of variable VHF rheostats for the sets of standard fixed substitution resistors used in crystal impedance meters for determining equivalent electrical parameters of quartz crystals.

Numerous other objects, features and advantages of the present invention will be apparent from consideration of the following specification taken in conjunction with the accompanying drawings, in which:

Fig. 1 is a perspective view of one form of the uncompensated VHF rheostat of the present invention, with the cover in a raised position.

Fig. 2 is a longitudinal vertical cross-section through the device shown in Fig. 1, with the cover removed.

Fig. 3 is a transverse vertical cross-section taken on the line 3—3 of Fig. 2.

Fig. 4 is a view similar to Fig. 1 of a modified form of the invention showing a series compensating capacity element.

Fig. 5 is a view similar to Fig. 2 of the device of Fig. 4.

Fig. 6 is a vertical cross-section taken on the line 6—6 of Fig. 5.

Fig. 7(a) is a fragmentary perspective view showing the wiring of our device.

Fig. 7(b) is a schematic wiring diagram showing the use of the present rheostat in the manner of the method of the present invention to take the place of sets of standard fixed substitution resistors used in crystal impedance meters for measuring the equivalent electrical parameters of quartz crystals.

Fig. 8 is a graph showing the phase-angle characteristics of one form of the present invention, showing the reactance of the present rheostat as compared with substitute resistors.

Fig. 9 is a similar graph showing the characteristics where the rheostat is provided with a shunt compensation of 3 mmfd.

Fig. 10 is a similar graph showing the characteristics of the rheostat when shunt compensation is 10 mmfd.

Fig. 11 indicates the characteristics of the phase-angle of the present VHF rheostat compensated by a shunt capacitor of 25 mmfd.

Figs. 12, 13 and 14 show the characteristics of the phase-angle of the present VHF rheostat series compensated by 39 mmfd., 91 mmfd. and 180 mmfd., respectively.

With respect to the structure of the VHF rheostat of the present invention, while it is understood that materials, sizes, configurations, designs and arrangements of parts may vary, each in accordance with specific varying requirements, the device may be broadly defined as comprising a base preferably through which suitable contacts are arranged to electrically connect a pair of parallel elements, one a collector bar of low resistance material and the other a resistance element of high resistance material. The elements are arranged in parallelism and are of equal effective electrical length. The base structure provides means for rotatably mounting a lead screw, which upon rotation will slideably adjust a shorting bar having contacts slideably engaging the resistance element and the collector bar. It will be seen that since the elements are of equal effective length, the length of the electrical path through the device is constant; further, the parallelism reduces capacitive effect between the elements. In that modification of the structure presented in Figs. 4, 5 and 6, it will be noted that at one end of the base adjacent the input terminal pin of the resistance element, a recess is formed which is adapted to receive selected compensating capacitors of varying values, which may be placed in series with the resistance element and the collector bar.

In the use of the present structure for carrying out the method of the present invention, a selected VHF rheostat suitably compensated may be located as indicated in Fig. 7(b) to take the place of one of a set of standard fixed substitution resistors used in crystal impedance meters for determining equivalent electrical parameters. Since the present rheostat may be adjusted to alter its resistance linearly between the limits of the fixed resistor, an accurate determination may be made without interpolation.

Referring now to the structural details of that form of the invention shown in Figs. 1–3 of the drawings, the VHF rheostat preferably comprises a body of plastic including a base 10 of generally rectangular form. At each end of the base 10 there is formed an upstanding integral shoulder, the shoulder 11 of the inner end being formed with a bearing bore facing forwardly and adapted to receive the free smooth end 13 of a lead screw 14 extending parallel over the base toward the forward shoulder 16 through which it is loosely mounted for free rotation by an external glass, crystal or Lucite non-conductive knob 17. It will of course be understood that in general the specific materials and details of construction and design may be considered as only illustrative or by way of suggestion; however, where plastic is referred to a dielectric material is intended. Furthermore, sizes are not suggested by way of limitation but for purposes of illustration.

On the upper face of the base 10 there is provided a pair of parallel electrical elements, one of which is a resistance element 18 preferably formed as a deposited nickel film of approximately 400 angstroms thickness on a glass plate of $\frac{1}{32}$ inch thickness, $\frac{1}{16}$ inch across and approximately $\frac{5}{8}$ inch long, the nickel film being conveniently deposited by a sputtering technique. The other element is a collector bar 19, of suitable low resistance material such as coin silver, disposed parallel with the resistance element and approximately $\frac{1}{16}$ inch apart therefrom. The elements are of approximate equal length, their upper surfaces being in the same parallel plane. In the present structure the forward end of the collector bar is electrically connected by a pin 20 extending through the base and through a securing panel 21 on the under face of the base. Similarly, the opposite rear end of the resistance element is electrically engaged by a pin 22. Thus the length of the electrical path is fixed as the distance between the pins 20 and 22. As will be hereinafter seen, this constant electrical path length is maintained at all times in the operation of the device.

Mounted upon the lead screw 15 for sliding movement thereover in response to rotation of the screw by the knob 17, there is mounted a glass or plastic carrier 23 which mounts a shorting bar comprising a central bridge 24 and a pair of integral parallel contact fingers 25 of spring formation which bear in parallel relation on the resistance element 18 and collector bar 19. As here shown, the block is substantially cubical in form but is preferably provided with legs 26 on either side thereof which bear against the top surface of the base on either side of the elements so as to maintain alignment of the block with its fingers in proper contact with the electrical elements. A cover 24, generally U-shaped in cross-section, is conveniently pivoted at the lower outer corner of the end shoulder 11 by means of a transverse pivot pin 27. The cover may be secured in closed position through the extension of a securing pin 29 passing through the apertures 28 at the opposite end of the cover.

In that form of our VHF rheostat shown in Figs. 4, 5 and 6, the general configuration is substantially the same as is the construction of Figs. 1, 2 and 3; therefore, like numerals are used to identify like parts. However, in the latter form of the invention the end shoulder 11 is formed with a substantially semi-circular recess 30 in which may be selectively mounted capacity devices indicated at 31 of various denomination as hereinafter referred to. The condenser 31 is adapted to be snugly fitted in the recess 30 which is formed in appropriate size to receive it and frictionally retain it. Lead 32 is provided from the capacity device to the outer end of the resistance element 18, and a second lead 33 is connected from the other side of the condenser 31 to the pin 22 which in this case is not connected to the resistance element 18 so that the condenser 31 is in series with the resistance element 18. A further lead 34 is provided between the lead 32 and a transverse connecting wire which extends transversely beyond the rheostat base to provide a connection 35. In regard to the cover of this second form of the rheostat, it will be noted that the cover may be cut away to accommodate the extension therefrom of the connecting wire 35. The arrangement will be seen to provide for a series or shunting connection of the capacitor with respect to the resistance element and collector bar.

In the operation of both forms of the present rheostat, it will be understood from the foregoing description that as the knob is rotated, turning with it the lead screw, the block is moved over the parallel top surfaces of the resistance element 18 and collector bar 19, in such movement the length of the electrical path remains constant, since as the length diminishes with respect to the resistance element when the block moves toward the electrical connection pin of the resistor it is compensated fully by the increased length of the non-resistance collector bar path. In this manner the low phase-angle is maintained. It will also be seen that by the parallel disposition of the collector and the resistance element, capacitive effects are reduced because of their parallel orientation. Furthermore, it will be noted that the connecting leads are as short as possible, thus eliminating undue reactances with respect thereto. In that form of the invention shown in Figs. 4–6, it will be seen that various capacitors may be readily inserted to alter the reactance of the device in accordance with particular requirements. It will be noted further that the structure is simple and compact, readily adjustable and of a minimum number of moving parts. After assembly and electrical connections are made, the cover may be readily swung into position to enclose the device.

In the testing of quartz crystals for determining the equivalent electrical parameters it is customary to provide a crystal impedance meter in the form of an oscillator as indicated at 40 in Fig. 7(b) of the present drawings and to provide in the feed back circuit indicated by the conductors 41 and 42 terminal poles 43 and 44 into which the crystal may be plugged or in lieu thereof a selected resistor of a set of variably calibrated resistors. In the testing as by the previous method the crystal is plugged into the feed back circuit and the oscillator is then tuned for a given response. Thereafter the crystal which is shown at 45 is withdrawn from the circuit and a fixed resistor is plugged therein. If the oscillator may then be tuned to the same condition which was achieved with the crystal it will of course be known that the crystal has an effective resistance similar to that of the known fixed resistance. However, in such operations only approximate determination of the crystal characteristics may be achieved since it will only be determined that the crystal resistance is within the range of fixed resistance. Fixed resistances are of the type indicated schematically at 46 in Fig. 7(b) while the variable VHF rheostat of the present invention is schematically indicated at 47. In the present method, in lieu of one of a set of fixed resistances, one of a set of VHF rheostats of appropriate compensation is plugged in after the crystal is removed and then by adjustment of the rheostat and the retuning of the oscillator an exact determination of crystal characteristics can be made without requiring an interpolation of the characteristics between the limits of the fixed resistance heretofore used.

To those skilled in the art it will be clearly apparent from Figs. 8-14 inclusive that the operation of the present rheostat in various arrangements of compensating condenser relationships will provide ideal responses in high frequency fields which have not heretofore been approached with rheostats available at this time.

From the foregoing it will be seen that the structure of the rheostat of the present invention provides a novel, simple and improved design and arrangement of parts admirably carrying out the objects that are herein set forth. It will further be noted that the invention provides a new and improved method of determining the equivalent electrical parameters of quartz crystals to a more accurate degree and with less time than was heretofore possible by the use of the substitute resistances. It will be understood that the invention is not concerned with a specific oscillator or crystal impedance meter, as indicated in Fig. 7(b), but that the invention does embrace the method of using substitute compensated very high frequency rheostats in lieu of the fixed resistances heretofore used. In the construction of the rheostat of the present invention, as well as the method herein set forth, it will be understood that numerous changes, modifications and the full use of equivalents may be resorted to without departing from the spirit or scope of the invention as defined in the appended claims.

We claim:

1. In a rheostat, means for producing a substantially resistive impedance response to the passage of current therethrough in the VHF range of frequencies comprising an elongated flat base of dielectric material, a pair of conductive strips mounted on said base parallel and adjacent one to another and extending longitudinally of said base wherein at least one of said strips comprises a thin conductive film applied as a coating on said base and having a different electrical conductivity than the other of said pair of conductive strips, said strips being mutually disposed such that the smallest longitudinal surfaces thereof are perpendicular to said base and mutually parallel whereby the capacitive impedance between said strips throughout the VHF range of operation is made negligible; a pair of terminal connections one on each of said strips at opposite ends thereof, a shorting bar bridging the strips intermediate said terminals in mutually perpendicular relation to said smallest longitudinal surfaces and contacting the top surfaces of said strips, said terminal locations in combination with said shorting bar providing a conductive path from one terminal to the other through said bar having a constant length for all positions of said bar intermediate said terminals, whereby the constant path length exhibits a substantially constant inductive reactance characteristic irrespective of the length of each element included in said conductive path when conducting current throughout the VHF range of operation, and a compensating capacitance connected in series with and tuned to resonance with said substantially constant inductive reactance of said conductive path over said VHF range of operation; the mutual disposition of said conductive strips and said constant length of said conductive path and the resulting negligible and substantially constant compensatable impedance characteristics thereof, respectively, throughout said VHF range of operation providing a rheostat having a substantially constant resistive impedance characteristic throughout the entire range of VHF operation.

2. The device as described in claim 1 wherein said conductive film on said base has a thickness of less than 400 Angstrom units.

References Cited in the file of this patent

UNITED STATES PATENTS

| | | |
|---|---|---|
| 2,610,227 | Bell | Sept. 9, 1952 |
| 2,625,633 | Warsher | Jan. 13, 1953 |
| 2,634,352 | Boykin et al. | Apr. 7, 1953 |
| 2,663,033 | Landis | Dec. 15, 1953 |
| 2,689,294 | Weber et al. | Sept. 14, 1954 |
| 2,733,405 | Gerber | Jan. 31, 1956 |

FOREIGN PATENTS

| | | |
|---|---|---|
| 952,427 | France | Nov. 16, 1949 |